Dec. 16, 1969   R. E. SWING ET AL   3,484,154
CROSSED DIFFRACTION GRATING
Filed Sept. 23, 1966
Fig. 1
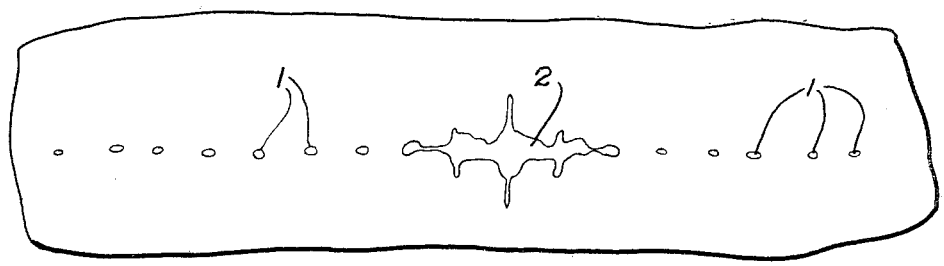
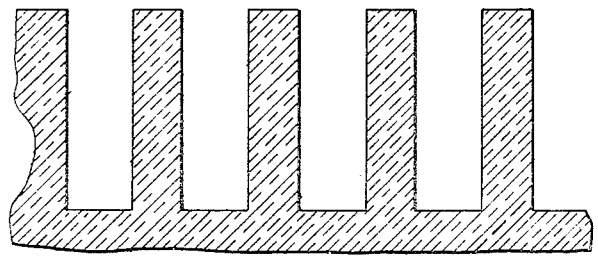
Fig. 3
Fig. 4
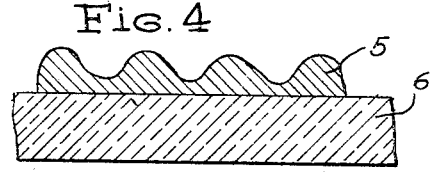
Fig. 2
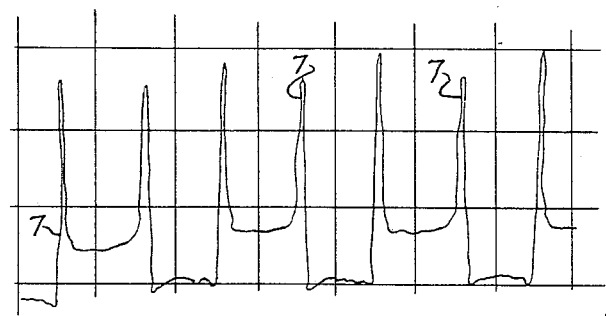
Fig. 5
INVENTORS
RICHARD E. SWING
JOSEPH A. MARSTEN
BY
*Harvey S. Boyd*
ATTORNEY United States Patent Office 3,484,154
Patented Dec. 16, 1969

3,484,154
CROSSED DIFFRACTION GRATING
Richard E. Swing, Rockville, Md., and Joseph A. Marsten, Alexandria, Va., assignors to the United States of America as represented by the Secretary of the Army
Filed Sept. 23, 1966, Ser. No. 582,214
Int. Cl. G02b 5/18; G03c 11/00
U.S. Cl. 350—162                                    2 Claims

ABSTRACT OF THE DISCLOSURE

This invention is an optical diffraction grating of etched and hardened photographic emulsion on glass which will display an extreme dispersion of spectral orders, having substantially equal energy intensity.

The invention described herein may be manufactured and used by or for the Government for governmental purposes without the payment to us of any royalty thereon.

BACKGROUND OF THE INVENTION

Field of the invention

This invention relates to crossed photographic phase gratings, and more particularly to a diffraction grating which will display a symmetric spectral energy distribution for use in direct image viewing.

Accordingly, it is an object of this invention to provide a photographic phase grating which will display a symmetric spectral energy distribution.

It is another object to provide a photographic phase grating that achieves maximum dispersion in a direct viewing system through the uniform deformation of the emulsion, together with equal energy distribution in as many spectral orders as possible.

It is further an object to provide a process for making photographic phase gratings using inexpensive ingredients, readily available on the commercial market.

Description of the prior art

It has been discovered that phase gratings which achieve extreme dispersion can be produced by proper exposure and etch-processing of photographic plates. Attention is directed to the preliminary work of Prescott, U.S. Patent No. 3,045,531, issued July 24, 1962, and Swing and Shin, "The Determination of Modulation-Transfer Characteristics of Photographic Emulsions in a Coherent Optical System," Photographic Science and Engineering, volume 7, number 6, page 350 (1963).

SUMMARY

This invention includes the discovery that a commercially available photographic plate, when exposed to a Ronchi ruling and developed according to a reversal process, may be used as a diffraction grating to produce a Fraunhofer pattern of discrete spectral orders of uniform intensity.

BRIEF DESCRIPTION OF THE DRAWINGS

The value and behavior of this grating will be explained by the following drawings:

FIG. 1 represents a photograph of a typical Fraunhofer diffraction pattern of a Ronchi ruling of 133 lines per inch.

FIG. 2 shows a representation of the upper right quadrant of a photograph of the Fraunhofer intensity pattern of the photographic crossed phase grating of this invention. In FIG. 2 the axis of the field corresponds to the lower left corner of the FIGURE 3.

FIG. 3 shows a cut-away view of a crenelate transmittance contour, a cross section typical of a Ronchi ruling, on glass;

FIG. 4 shows a transmittance contour of gelatine 5 on glass 6 dried from the ruling of FIG. 3, as for example, by the method of Prescott, 3,045,531; and FIG. 5 shows the representation of a microdensitometer trace 7 of a 130 cycle per inch phase grating photographic plate whose thickness variations have been converted to density variations through dye-infusion. It should be noted that the microdensitometer gain was turned extremely high to emphasize the edge contour, and therefore the trace is not representative of the actual grating profile.

DESCRIPTION OF THE PREFERRED EMBODIMENT

FIG. 1 was photographed with 5461 angstrom unit, A., illumination at a collimator focal length of 618 mm., which locates successive maxima at integral multiples of 5.19 cycles per mm. for this particular ruling. Fifteen orders 1 can be observed visually, but the higher orders have been suppressed. The size of the dots 2 illustrates the concentration of energy in the lower orders, along the axis of the field. The dots 2 have the particular configuration shown because the photograph was typically over-exposed. When the spectral distribution of FIG. 1 is viewed with the eye, the impression is one of a group of bright, but very distinct spots. The dots 1 and 2 are actually white on a black background in the photograph.

In FIG. 2 the quadrants not shown exhibit the same distribution. The grating had a nominal period of 800 cycles per inch. Illumination was at 5461 A. with a band width of 25 A. The grating was on Kodak high resolution emulsion coated on glass of standard flatness, 0.060 inch thick. The photograph was cropped to exhibit only the inner 169 spectral orders. The dots 4 are actually white in the photograph on a black background.

The phase grating corresponding to FIG. 5 was constructed through the process of this invention. The microdensitometer used a slit of 50 microns by 2.5 microns and a scale of 1 inch=0.0977 mm. FIG. 5 represents a scale of 1 inch on the microdensitometer trace being equal to 1.5 inches on the representation.

It is known in the art that a Ronchi ruling as for example in FIG. 3, or crenelate transmittance distribution, may be reproduced using the Prescott technique or by rendering the focus soft on a photographic plate thereby producing a diffraction grating which has as its limit a fundamental sine wave and spectra of zero or first order, but not substantial spectra of other orders. See FIG. 4. Normal photographic methods, however, will produce rulings having many spectral orders, but with a widely-varying distribution of energy in the orders.

It is also known if two diffraction gratings are oriented so that the lines of one run perpendicular to the lines of the other their Fraunhofer pattern will consist of a field of discrete spectral orders. These orders generally are weaker as the distance from the main axis of the field increases. The weakest orders are generally located along the field diagonals.

It has been discovered that if the phase gratings are on the same surface and of the same material, produced by a photographic reversal process, the lines produces a diffusion interaction at their intersections which is conductive to strengthening those spectral orders which lie off the major axis of the Fraunhofer field. See FIG. 2.

The grating of this invention is produced essentially through a photographic etching process. The technique, which removes the silver and its associated gelatine from an exposed plate, has as its key step a first fixation where no hardener is used. When a hardening fixing bath is used, the subsequent etching process tends to remove the entire emulsion above that level of deepest exposure penetration. This obviates the exploitation of thickness variations. Steps of final fixation and hardening are used to accomplish the tanning necessary for emulsion permanance. The emulsion is processed in solutions where pH values differ widely, but are primarily off neutral on the acidic side. Washing steps are used to minimize the shock of large pH changes and eliminate solution inter-contamination.

It has also been discovered that the dispersion produced is closely related to exposure. A one second difference in a useful exposure range of fifty seconds often has a discernable effect. This may be explained by the fact that the process has such a high effective contrast, or gamma. This means that small changes in input exposure are amplified by the steepness of the transfer curve relating density (and consequently thickness difference) and exposure. It has been found that differential emulsion thickness quickly reaches a maximum in the first quarter of the exposure range, and then slowly drops as more emulsion is removed. This is based on the observation that maximum dispersion occurs at or near maximum differential thickness.

The etching of the developed emulsion simulates a reversal process without redevelopment, the amount of emulsion removed being directly related to exposure. When exposure is just penetrating the emulsion thickness differences increase proportionately. This results as a consequence of linear exposure increase and the extreme processing contrast afforded by the emulsion type and developer used. After the thickness maximum is reached, subsequent exposure begins to diffuse into the emulsion, more of which is then removed as a uniform layer by etching. Thus, overexposure has much the same effect on thickness difference as haze has on a photographic image—the contrast or thickness difference steadily decreases with increasing exposure.

It was discovered that in the area of less than optimum exposure scattering by the grating results in a background glow around the diffraction pattern. In a high resolution emulsion, however, scattering drops to insignificance when the exposure time for optimum dispersion is reached and remains negligible as the exposure time increases thereafter.

The essential features of this invention involve the two step exposure of commercially available plates consisting of high resolution or high quality process emulsion on micro flat glass through a Ronchi ruling grate in the first step, and then a second exposure through the grate for an equal time oriented 90 degrees with respect to the first exposure to form a cross-hatched grid, followed by the development of the exposed plate in the hereinafter described manner to produce a photographic phase grating the diffraction from which is characterized by an exceedingly high number of discrete spectral orders, symmetrically spaced, with a general uniformity of energy distribution not common to commercially available diffraction gratings of equivalent spacing.

The reproduction of a crenelate transmittance distribution herein, rather than softening the outlines and producing a fundamental sine wave, has as its purpose an enhancement of the outlines. The enhancement of the outlines appears to strengthen the harmonic content of the image which would tend to explain the effect of strengthening those spectral orders which lie off the major axes of the Fraunhofer field.

The process may be described as follows:

A Ronchi ruling was used as an object, and exposed by contact onto the emulsion side of a photographic plate. Kodak process plates and Kodak high resolution plates were used successfully. The dispersion of the phase grating is related to exposure, so that the exposure control is critical. Generally the optimum thickness difference between the peaks and valleys of the phase grating, with the resulting optimization of dispersion, is selected by fixing the middle of a trial exposure range of two second increments. In the region of under exposure, dispersion is slight, scattering high, and the grating characterized by excessive gelatin thickness manifested by a milky appearance. In the region of over exposure, dispersion is again slight, scattering negligible, and the gelatin is quite thin. The limit of over-exposure is reached when the entire emulsion is removed; diffraction is impossible. Gratings produced in the region of overexposure are characteristically clear. Properly exposed and processed gratings which possess wide dispersive properties have a characteristic opalescent appearance when viewed in incoherent illumination by reflection.

The required optical quality varies with the intended application. For clean Fraunhofer maxima in the intended application discussed herein, it is necessary that the plates be extremely flat. A plane figure with 0.00002 inch per linear inch tolerance is adequate. This flatness can be achieved with Kodak Micro-Flat glass.

All exposures were made with unfiltered tungsten illumination through Ronchi rulings, the widths of whose lines and spaces are chosen to provide the appropriate energy equalization among the required orders. Ruling periods present no problem and can easily exceed 1000 cycles per inch. The illumination must be even, or the etching which removes emulsion will not give a grating of optical uniform quality. Processing is carried out at 68 degrees Fahrenheit. Plates are processed in stainless-steel hangers, and standard chemical and darkroom procedures and precautions are observed.

After exposure the following procedure is applied to convert the exposed photographic plate to a photographic diffraction grating:

(1) Develop the image with continuous agitation. The developing liquids used which have proved satisfactory are: Kodak D–8, time 4 minutes; Kodak D–11, time 6 minutes; Kodak D–19, time 4 minutes. The developing solution has a pH of around 10.5.

(2) Wash the plate in running water for at least 30 seconds.

(3) Immerse the plate in a non-hardening fixing bath for 10 minutes with intermittent agitation. The pH of the non-hardening fixing bath is around 5.50. Commercial baths used were Kodak F–24 or hardener-free matrix fixer.

(4) Wash the plate in running water for at least 30 minutes.

(5) Immerse the plate in an etching solution of the following composition for 4 minutes with continuous agitation:

Part A

Water _____ fl. ozs__ 48
Cupric nitrate _____ ozs__ 27
Potassium bromide _____ ozs__ 1.32
Glacial acetic acid _____ fl. ozs__ 20
Water to make 1 gallon.

Part B 3 percent solution of hydrogen peroxide. Mix equal parts of A and B, and use immediately. The pH of the solution is 1.50. All the developed silver and its associated gelatin must be removed.

(6) Wash in running water for at least 30 minutes.

(7) Immerse the plate in a standard acid hardener fixing bath having a slightly acidic pH, for example 4.6, with continuous agitation until the background milkiness is removed. This usually occurs within seconds after immersion. Total immersion time should be at least one minute.

(8) Rinse the plate in running water.

(9) Immerse the plate in a hypo-eliminating bath for 4 minutes, with continuous agitation. Heico's Perma-Wash (3 ozs. per gallon) was used. The pH of this bath is around 6.5.

(10) Wash the plate in running water for at least 4 minutes.

(11) Immerse the plate in a hardening bath for 4 minutes, with continuous agitation. Kodak hardening bath SB-4 was used.

(12) Wash the plate in running water for at least 4 minutes.

(13) Immerse the plate in a wetting agent. The particular agent used was a 1 percent solution of Kodak Photoflo having a pH of 7.58. The immersion time was 2 minutes. It must be noted that during the immersion the image area is not swabbed or wiped.

(14) The plate is then allowed to dry in a cool, dry atmosphere. Best results are achieved with natural drying as compared to force-drying in heated cabinets.

We claim:

1. A cross-hatched optical phase grating designed to diffract light passing therethrough into spectral orders of uniform intensity, comprising an exposed, developed, fixed, etched, and hardened photographic plate, said plate having been exposed successively by contact with illumination passing through a Ronchi ruling, and then exposed with illumination passing through a Ronchi ruling having lines disposed perpendicular to the first exposure, said photographic plate comprising:

(a) a flat glass base having a tolerance of at least 0.0005 inch per linear inch;

(b) a gelatin coating on a surface of said base, said coating having a uniform series of sharp maxima and minima thicknesses in cross section, the apex of the maxima defining a cross hatch and corresponding to that area of said plate exposed to light of the weakest intensity, the maxima and minima corresponding to the intensity of the light which exposed said plate, so that said plate has a gelatin surface having a cross-hatched contour of uniform thickness variations designed to diffract light passing through said plate into spectral orders of uniform intensity.

2. A cross-hatched optical phase grating which will diffract light passing therethrough into spectral orders of uniform intensity comprising:

(a) a rigid, flat, transparent sheet having a uniform thickness tolerance of at least 0.0005 inch per linear inch;

(b) a gelatin coating on a surface of said sheet, said gelatin coating having a cross sectional contour of a uniform series of maxima and minima, the maxima having apexes which define a cross hatch on the surface of said coating, the minima forming sharp identations within the cross hatch lines defined by the apexes, so that the light striking the cross hatched surface of said coating and passing through said grating will be dispersed at said coating surface and diffracted into spectral orders of uniform intensity.

References Cited

UNITED STATES PATENTS

| 734,134 | 7/1903 | Porter. | |
| 1,722,368 | 7/1929 | Comstock | 96—38.3 |
| 3,045,531 | 7/1962 | Prescott | 350—162 |

GEORGE F. LESMES, Primary Examiner

R. E. MARTIN, Assistant Examiner

U.S. Cl. X.R.

96—38.3